United States Patent

[11] 3,621,078

| [72] | Inventors | Hajime Kitamura;<br>Toshihide Shimizu, both of Niigata-ken, Japan |
|---|---|---|
| [21] | Appl. No. | 789,914 |
| [22] | Filed | Jan. 8, 1969 |
| [45] | Patented | Nov. 16, 1971 |
| [73] | Assignee | Shin-Etsu Chemical Industry Co., Ltd. Tokyo, Japan |
| [32] | Priority | Nov. 20, 1965 |
| [33] | | Japan |
| [31] | | 40/71318 |
| | | Continuation-in-part of application Ser. No. 595,609, Nov. 21, 1966, now abandoned. This application Jan. 8, 1969, Ser. No. 789,914 |

[54] CHLORINATION OF A GRAFT POLYMER OF A VINYL AROMATIC ON POLYVINYL CHLORIDE
16 Claims, No Drawings

[52] U.S. Cl. ..................................... 260/884,
204/159.18, 260/29.1 R, 260/29.6 CM, 260/31.2
R, 260/32.8 R, 260/33.4 R, 260/33.8 UA,
260/92.8 AC
[51] Int. Cl. ..................................... C08f 19/02

[50] Field of Search ........................................... 260/92.8
AC, 884; 204/159.17, 159.18

[56]                References Cited
              UNITED STATES PATENTS

| 3,167,535 | 1/1965 | Gateff et al. .................. | 260/92.8 |
| 3,360,590 | 12/1967 | Liepins ......................... | 260/884 |

FOREIGN PATENTS

| 1,439,357 | 4/1966 | France ........................ | |
| 817,684 | 8/1959 | Great Britain ................. | |
| 1,041,992 | 9/1966 | Great Britain ................. | |

*Primary Examiner*—Murray Tillman
*Assistant Examiner*—J. Seibert
*Attorney*—McGlew and Toren ABSTRACT: A heat-stabilized polyvinyl chloride resin prepared by chlorinating a graft polymer of 95 to 50 parts by weight of polyvinyl chloride and 5 to 50 parts by weight of a vinyl aromatic monomer. The effect of the heat stabilization will be further increased if the vinyl chloride resin, after being subjected to the postchlorination, is treated with olefinic hydrocarbon, having preferably less than four carbon atoms.

CHLORINATION OF A GRAFT POLYMER OF A VINYL AROMATIC ON POLYVINYL CHLORIDE

REFERENCE TO PRIOR APPLICATION

This is a continuation-in-part of our application Ser. No. 595,609, filed Nov. 21, 1966, now abandoned.

SUMMARY OF THE INVENTION

This invention generally relates to polyvinyl chlorides and is particularly directed to a novel heat-stabilized polyvinyl chloride resin of superior mechanical, physical and electrical properties. The invention is also concerned with a process of preparing the new and improved heat-stabilized polyvinyl chloride resins.

So-called rigid polyvinyl chloride moldings have become known in the art, which are generally obtained by adding stabilizers, fillers and the like to polyvinyl chlorides, whereafter the mixture is molded. Such rigid polyvinyl chloride moldings are widely used because of their excellent chemical and physical properties. However, it is also known that the present rigid polyvinyl chloride moldings have certain serious shortcomings in that they cannot be used as structural materials. This is so because the resins have an extremely low softening point so that the molded products tend to become deformed at temperatures as low as 60° to 70° C.

Various proposals have previously been made in order to overcome this drawback, to wit, to raise the softening point to a higher value at which the moldings can be put to additional uses. It has thus been suggested to copolymerize vinyl chloride with a fluoroethylenic monomer or with diallyl phthalate. However, both of these methods are not fully satisfactory. While the softening point is raised when vinyl chloride is copolymerized with a fluoroethylenic monomer, the fluidity, in turn, decreases significantly and considerably higher processing temperatures are required. Due to such higher processing temperatures, the resins tend to become decomposed and are discolored and blackened in the course of the processing. On the other hand, if the vinyl chloride is copolymerized with diallyl phthalate, considerable difficulties are encountered in carrying out the copolymerization in an effective and successful manner.

According to a different proposal, it has been suggested to raise the softening point by chlorinating polyvinyl chloride. However, again, this prior art proposal does not result in a fully satisfactory product, because the postchlorinated polyvinyl chloride obtained exhibits insufficient fluidity at the increased molding temperatures of 170° to 190° C. If the molding temperature is raised, in order to improve the fluidity and the molding efficiency, the chlorinated polyvinyl chloride is dehydrochlorinated and blackened because the molding temperature is then very close to the thermal decomposition temperature of the product. Therefore, in molding or otherwise processing postchlorinated polyvinyl chloride, it is important that the molding temperature for polyvinyl chloride proper is maintained in order to obtain the desired results. With this in mind, a method of chlorinating copolymers, for example, of vinyl chloride with vinyl acetate or vinyl alkyl ether has been proposed in French Pat. No. 758,454, or with aromatic vinyl monomer. However, it has been established that the copolymers obtained in accordance with the teachings of the French patent are invariably inferior in respect to their thermal stability to polyvinylchloride proper and, when chlorinated, they tend to become dehydrochlorinated and tinged upon molding because of their poor heat stability and fluidity characteristics.

Accordingly, it is a primary object of the present invention to overcome the disadvantages of the prior art procedures and to provide for heat-stabilized polyvinyl chloride resin of improved mechanical, physical and electrical properties which can be molded at the customary molding temperatures for polyvinyl chloride proper.

It is also an object of this invention to provide for a heat-stabilized polyvinyl chloride resin of superior characteristics and quality which is easily manufactured at relatively low cost.

Generally, it is an object of this invention to improve on the art of heat-stabilized polyvinyl chlorides as presently practiced.

Briefly, and in accordance with this invention, a superior heat-stabilized polyvinyl chloride resin is obtained by chlorinating a graft polymer formed by grafting X 5 to 50 parts by weight of a vinyl aromatic monomer to 95 to 50 parts by weight of polyvinyl chloride.

The postchlorinated graft polymer obtained in accordance with the present invention has a significantly improved heat stability and fluidity characteristic as compared to polyvinyl chloride proper. For example, if the graft polymer containing 10 parts by weight of a vinyl aromatic monomer is subjected to a heat stability test for the purpose of establishing the time required for blackening the polymer, it is found that this time is about 1½ times the period necessary for blackening polyvinyl chloride proper. Similarly, the corresponding time for blackening a graft polymer containing 20 parts by weight of a vinyl aromatic monomer is about 1.7 times of that required for blackening polyvinyl chloride proper. It has also been established that practically no dehydrochlorination takes place in the course of molding the copolymer or graft polymer and for this reason, the resins are not blackened during or by the molding operations. Further, the inventive product has excellent fluidity and superior gelation properties at the time of molding. For this reason, they can be advantageously molded at the same working temperature that is suitable for polyvinyl chloride proper.

The graft polymer which is chlorinated in accordance with the present invention is formed so as to have a composition ratio of 95 to 50 parts by weight of vinyl chloride or polyvinyl chloride and 5 to 50 parts by weight of vinyl aromatic monomer. These limitations of the composition ranges of the product are important, because if the amount of vinyl aromatic monomer is less than about 5 parts by weight, the resulting resin exhibits a heat stability which is only about the same as that of polyvinyl chloride proper. On the other hand, if the amount of vinyl aromatic monomer exceeds the 50 parts by weight limit, then the resulting resin will not exhibit a higher softening point. The preferred amount of vinyl aromatic monomer within the indicated range is between about 10 to 30 parts by weight.

A variety of vinyl aromatic monomer may be used as the comonomer to be grafted to polyvinyl chloride. The following vinyl aromatic monomers are mentioned as preferred examples:

Styrene, α-methyl styrene, vinyl toluene, vinyl xylene and vinyl naphthalene.

Styrene has proved to be particularly advantageous from a technical and plant operational point of view.

The graft polymer may be obtained by grafting a vinyl aromatic monomer to polyvinyl chloride or, more particularly, by adding 5 to 50 parts by weight of the vinyl aromatic monomer to an emulsion containing 95 to 50 parts by weight of polyvinyl chloride in terms of solid content obtained by emulsion polymerization. Thereafter, if necessary in the presence of an emulsifier, as for example, sodium lauryl sulfate, sodium dodecyl benzene sulfonate, or sodium dialkyl sulfo phosphate, the mixture is subjected to graft polymerization at 30° to 80° C. in the presence of a water-soluble catalyst such as potassium persulfate or ammonium persulfate. Instead of a water-soluble catalyst, an oil-soluble catalyst such as lauroyl peroxide, α,α'-azobis-dimethyl-valeronitrille,α,α,'-azobis-isobutylonitrile, diisopropyl peroxydicarbonate, or acetyl cyclohexyl sulfonyl peroxide, may be used.

Alternatively, the graft polymerization may be accomplished by adsorbing 5 to 50 parts by weight of a vinyl aromatic monomer into the pores or onto the surface of porous polyvinyl chloride in an amount of 95 to 50 parts by weight, whereafter the mixture is dispersed in an aqueous medium for graft polymerization at 30° to 80° C., more preferably 50° to 65° C., in the presence of a water-soluble or oil-soluble catalyst of the indicated nature. In this case, temperature higher than 80° C. is not preferable because the graft polymer which may be obtained under such temperature will show poor thermal stability.

In suspension polymerization, water which is mainly used as a suspension medium is needed to be added in an amount sufficient to enable said polyvinyl chloride to be suspended; in general, one to three times the amount of polyvinyl chloride may be appropriate. The amount of said water-soluble or oil-soluble catalyst to be used is 0.5 to 2.0 percent by weight of vinyl aromatic monomer and it is preferable that such catalyst be first dissolved in vinyl aromatic monomer and then mixed with polyvinyl chloride. According to the invention, it was found, as the result of analysis, that the graft polymer obtained had grafted at least 50 percent by weight of vinyl aromatic monomer. The polyvinyl chloride may have been obtained by suspension polymerization or any other suitable polymerization method.

The postchlorinated polymer according to the present invention is obtained by dispersing the graft polymer preparation as above in a suspension medium and then chlorinating the polymer with chlorine gas. A suspension medium suitable for this purpose is, for example, a halogenized hydrocarbon such as carbon tetrachloride, chloroform, methylene chloride, tetrachloroethane, dichloroethane, trichloroethane or pentachloroethane, a ketone such as methylethyl ketone, an ester such as methylacetate or butyl acetate, an alcohol such as methanol or ethanol, hydrochloric acid, or water, or mixture thereof.

The postchlorination may be carried out either by photoradiation in the presence of chlorine or by heating the suspension to 70° to 200° C. in the presence of chlorine and 0.01 to 3 percent by weight of an oil-soluble catalyst such as benzoyl peroxide, azobis-isobutylonitrile or lauryl peroxide or such water-soluble catalyst as potassium persulfate or dicumyl peroxide which gives off free radicals on heating. If the chlorination is effected by photochlorination, this is preferably carried out at the lowest possible temperature, preferably at or below 70° C. in order to minimize melt deposition and dehydrochlorination. The procedure is usually carried out by ultraviolet radiation in the wavelength range of 3,000 to 6,000 A at ordinary temperature and normal pressure. The photochlorination depends on the flow rate of the chlorine gas and the intensity of the ultraviolet radiation. Therefore, the reaction can be completed within a very short period of time. If the conditions are suitable, the reaction can be completed within one hour. With an increase of the intensity of ultraviolet radiation, the flow rate of the chlorine gas can also be increased. As a suitable reaction arrangement, it is recommended that a reaction vessel be used which is equipped with an agitator, a chlorine gas inlet pipe, a discharge or exhaust pipe and an ultraviolet radiation source such as an ultraviolet lamp.

Graft polymer thus chlorinated does not show the rise of softening temperature in case of that with chlorine content of less than 30 percent by weight, while it shows poor fluidity and requires higher molding temperature in case of that with chlorine content of more than 70 percent by weight, and in neither case shows good processability. By reason of this, chlorine content of the chlorinated graft polymer is preferable to be 30 to 70 percent more preferably 50 to 65 percent by weight of the polymer. For that purpose, the amount of chlorine to be supplied in chlorinating the graft polymer is suitable to be 1.2 to 1.5 times of that of chlorine to be contained in the result product, i.e., the chlorinated graft polymer.

On the other hand, postchlorinated polyvinyl chloride resin obtained by said method may be improved in its thermal stability when further treated by an olefinic hydrocarbon which easily separates and removes chlorine being left in very small quantities in the polymer therefrom as chlorinated hydrocarbon.

It is preferable to carry out the treatment with the olefinic hydrocarbon either in the gas phase or the liquid phase or when the hydrocarbon is present as mist. Therefore, olefinic hydrocarbon is to be chosen from the group consisting of ethylene, propylene and butylene which are in the gaseous state at room temperature or which are liquid, but can be easily gasified at a temperature below 100° C. The hydrocarbons mentioned may be used singly or in mixture of more than two.

The reaction conditions, such as the amount of hydrocarbon to be used, the reaction temperature, the reaction time and the internal pressure are decided in accordance with the state of the reaction product, and in general they may preferably be the same as the ones under which the chlorinating reaction has been carried out. For example, the reaction is carried out below 100° C., preferably below 65° C. The amount of hydrocarbon to be used in this case may preferably be 0.01 to 0.03 mole percent by weight of the polymer.

The postchlorinated vinyl chloride resin subjected to said treatment is filtered or placed in a centrifugal separator, so as to remove moisture by well-known methods, washed with water and neutralized with alkali solution until the solution becomes neutral; it is then dried. The product obtained is ready for use. If, after being washed with water, the resin is further washed with an organic solvent, such as methanol or acetone, the heat stability of the product will be further increased.

In practicing the method of the invention, it is advantageous for practical use to employ as an olefinic hydrocarbon one that will give the same chlorinated hydrocarbon as the one which is employed as a suspension medium in the postchlorination of vinyl chloride resin; e.g., in case dichloroethane is used as the suspension medium, it is advisable to employ ethylene as olefinic hydrocarbon, because then its recovery can be carried out easily and at the same time and the resulting product will contain little chlorine.

The invention will now be described by several examples, it being understood, however, that these examples are given by way of illustration and not by way of limitation and that many changes may be effected without affecting in any way the scope and spirit of this invention as recited in the appended claims.

a. Determination of Flow Temperature of Vinyl Chloride Polymer

The temperature at which a flow rate of 2 ml./min. was attained with a constant temperature rise at a rate of 6° C./min. under a pressure of 200 kg./cm.$^2$ was regarded as the flow temperature of the particular sample, in conformity to the testing method of ASTM D569.

b. Determination of Softening Temperature

The softening and brittle temperatures of the products were determined in accordance with the testing procedures defined in ASTM–1043–51 and the softening temperature was expressed in terms of changes of rigidity with the temperature.

c. Conditions for Preparation of Test Sheets

To 100 parts by weight of the resin were added 3 parts by weight of a stabilizer (organic tin mercapto compound) and one part by weight of stearic acid. The mixture was formed into a test sheet under the following conditions: roll milling temperature 180° C., kneading time 5 min., pressing temperature 200° C., pressing time 5 min., and pressure 200 kg./cm.$^2$.

d. Gelatin Test (Fish-Eye Test)

To 100 g. of vinyl chloride resin were added 50 g. of dioctyl phthalate, 2 g. of dibutyl tin maleate, 0.8 g. of cetyl alcohol, 0.1 g. of barium stearate, 0.1 g. of cadmium stearate, 0.5 g. of titanium dioxide and 0.05 g. of carbon black. The mixture was rolled at 180° C. for 2 minutes into a 1 millimeter-thick sheet. The number of transparent particles per 100 cm.$^2$ contained in the sheet thus formed was counted as representing the gelation of the product. The gelation of the product was improved with a decrease in the number of particles.

EXAMPLE 1

A glass-lined 50 liters autoclave was charged with 20 kg. of water and 10 kg. of porous polyvinyl chloride having an average polymerization degree of 1,000, which was obtained by suspension polymerization, evacuated, and then was charged with a solution of 10 g. of α,α'-azobis-dimethyl-valeronitrile in 1 kg. of styrene. With stirring, the mixture was reacted for 20 hours at a temperature inside the vessel of 60° C. The polymer that resulted was dehydrated and air dried at 50° C.

700 g. of the sample thus obtained were introduced into a 5 liters flask, together with 3 liters of water and 500 of dichloroethane. Under irradiation with a 600 w. ultraviolet lamp, the mixture was reacted for 5 hours at 30° C. while chlorine gas was passed through at a rate of 100 cc./min. After the reaction was completed, the unreacted chlorine gas within the vessel was replaced by nitrogen gas, and then a half of sample was taken out from reactor. Subsequently, ethylene was introduced into the reactor in gaseous phase, at the velocity of 100 cc./min. for 20 minutes, while the irradiation of the mercury lamp was continued and the temperature inside the vessel was maintained at 60° C. The mercury lamp was switched off and the gas inside the reactor was once more replaced by nitrogen. The reaction mixture thus obtained was filtered, washed with water and the filtered residue was immersed in a 5 percent solution of sodium bicarbonate for 30 minutes, filtered again, and the residue was washed with water until the filtrate of the residue became neutral, and then dried. After the drying, the samples were tested for density, chlorine content, fluidity characteristics, softening temperature, thermal stability and gelation. The results obtained were as shown in table 1. The properties of polyvinyl chloride having a polymerization degree of 1,000, and the chlorinated compound thereof, are also shown in the same table. In the untreated chlorinated graft polymer, 0.07 weight percent of adsorbed chlorine was detected as retained therein, but in the product treated with ethylene, no chlorine was found.

CONTROL 1

Into a glass-lined 50 one liter autoclave were charged 10 g. of lauryl sodium sulfate, 20 g. of sodium bicarbonate, and 8 g. of sodium sulfite, all dissolved in 20 kg. of water. After replacement by nitrogen, the gas inside the vessel was evacuated. 9 kilograms of vinyl chloride monomer, 1 kilogram of styrene and 20 g. of potassium persulfate dissolved in a small amount of water were placed in the vessel. With stirring, the polymerization was initiated at an internal temperature of 50° C. In 24 hours an internal pressure of 4 kg./cm.² was attained, then the vessel was degassed, cooled, and the resulting latex was dried by spraying. Postchlorination of copolymer thus obtained was carried out as in example 1, except that an ethylene treatment was not subjected to postchlorinated copolymer.

CONTROL 2

A glass-lined 50 one liter autoclave was charged 10 kg. of postchlorinated polyvinyl chloride (chlorine contents 65.0 weight percent) with a solution of 1 g. of α-α'-azobis-2,4,-dimethyl-valeronitrile in 1 kg. of styrene. And the air inside the vessel was replaced by nitrogen while the internal pressure was maintained at 2 kg./cm.². After stirring for 1 hour, the polymerization was initiated at an internal temperature of 60° C. Twenty hours afterwards, a powder obtained was washed by methanol, and then dried by air. An overpolymer was thus obtained.

In table 2 the properties of sample obtained by above-mentioned two controls as determined under the same conditions are also shown.

TABLE 1

| Sample | Chlorine (wt. percent) | Density at 30° C. | Softening temp. (° C.) | Flow temp. (° C.) | Heat stability (at 190° C.) | Gelation (pc.) |
| --- | --- | --- | --- | --- | --- | --- |
| Graft polymer of styrene to polyvinyl chloride | 49.5 | 1.35 | 70 | 178 | Blackened in 120 min | 4 |
| Chlorinated compound of graft polymer of styrene to polyvinyl chloride (no ethylene treatment). | 56.4 | 1.52 | 103 | 162 | do | 8 |
| Chlorinated compound of graft polymer of styrene to polyvinyl chloride (after ethylene treatment). | 56.4 | 1.52 | 103 | 162 | Not blackened in 120 min. | 8 |
| Polyvinyl chloride | 56.8 | 1.40 | 70 | 190 | Blackened in 50 min | 2 |
| Chlorinated polyvinyl chloride | 59.0 | 1.58 | 105 | 230 | Blackened in 20 min | 1,000< |

TABLE 2

| Sample | Chlorine (wt. percent) | Density at 30° C. | Softening temp. (° C.) | Flow temp. (° C.) | Heat stability (at 190° C.) | Gelation (pc.) |
| --- | --- | --- | --- | --- | --- | --- |
| Chlorinated compound of copolymer of vinyl chloride and styrene | 55.3 | 1.48 | 99 | 170 | Blackened in 120 min | 103 |
| Overpolymer of vinyl chloride and styrene | 59.0 | 1.55 | 102 | 173 | do | 500 |

As can be seen from table 1 and table 2, chlorinated compound of graftpolymer of styrene to polyvinyl chloride was resulted in considerable decrease in the flow temperature and with improved gelation, compared with chlorinated copolymer and over-polymer.

EXAMPLE 2

Postchlorination and posttreatment of graft polymer of styrene to polyvinyN chloride were carried out under the same conditions as in example 1, except that propylene, 1-butane and ethylene-propylene mixture was used respectively instead of ethylene. The results of postchlorinated graft polymer (chlorine content: 58.2 weight percent) thus obtained were as shown in table 3.

TABLE 3

| Post-treating agent | Softening temp. (° C.) | Flow temp. (° C.) | Heat stability at 190° C. | Gelation (pc.) |
| --- | --- | --- | --- | --- |
| None | 106 | 168 | Blackened in 100 min. | 36 |
| Propylene | 106 | 168 | Blackened in 120 min. | 36 |
| 1-butane | 106 | 168 | do | 36 |
| Propylene-butane | 106 | 168 | do | 36 |

EXAMPLE 3

The reaction was effected under the same conditions of compounding of materials, graft polymerization and chlorination as in example 1, except that α-methyl styrene was used instead of styrene. The results obtained were as shown in table 4.

In table 4, the properties of vinyl chloride-α-methyl styrene graft polymer as determined under the same conditions are also shown.

TABLE 4

| Sample | Chlorine (wt. percent) | Density at 30° C. | Softening temp. (° C.) | Flow temp. (° C.) | Heat stability (at 190° C.) | Gelation test (pc.) |
|---|---|---|---|---|---|---|
| Graft polymer of α-methyl styrene to polyvinyl chloride | 48.8 | 1.34 | 73 | 172 | Not blackened in 120 min. | 11 |
| Chlorinated compound of graft polymer of α-methyl styrene to polyvinyl chloride. | 57.2 | 1.54 | 105 | 170 | ___do___ | 20 |

What is claimed is:

1. A heat-stabilized polyvinyl chloride resin prepared by chlorinating a graft polymer of 95 to 50 parts by weight of polyvinyl chloride and 5 to 50 parts by weight of vinyl aromatic monomer grafted to said polyvinyl chloride.

2. A resin as claimed in claim 1, wherein the polyvinyl chloride is porous polyvinyl chloride obtained by suspension polymerization method and the chlorine content of said chlorinated graft polymer is 30 to 70 percent by weight of said resin.

3. A resin as claimed in claim 1, wherein the vinyl aromatic compound monomer is selected from the group consisting of styrene, α-methyl styrene vinyl toluene, vinyl xylene and vinyl naphthalene and the chlorine content of said chlorinated graft polymer is 30 to 70 percent by weight of said resin.

4. A heat-stabilized polyvinyl chloride resin, having chlorine contents of 50 to 65 percent by weight of said resin, prepared by chlorinating a graft polymer, which is obtained by grafting a mixture consisting of 90 to 70 parts by weight of porous polyvinyl chloride and 10 to 30 parts by weight of vinyl aromatic monomer.

5. A resin as claimed in claim 4, wherein the porous polyvinyl chloride is obtained by suspension polymerization method.

6. A resin as claimed in claim 4, wherein the vinyl aromatic compound monomer is styrene.

7. A process of preparing a heat-stabilized polyvinyl chloride resin having chlorine contents of 30 to 70 percent by weight of said resin, which comprises chlorinating a graft polymer of 95 to 50 parts by weight of polyvinyl chloride and 5 to 50 parts by weight of vinyl aromatic monomer grafted to said polyvinyl chloride.

8. A process as claimed in claim 7, wherein the chlorination is effected with ultraviolet irradiation in the presence of chlorine gas.

9. A process as claimed in claim 7, wherein the polyvinyl chloride is porous polyvinyl chloride obtained by suspension polymerization.

10. A process as claimed in claim 7, wherein the vinyl aromatic monomer is selected from the group consisting of styrene, α-methyl styrene, vinyl toluene, vinyl xylene and vinyl naphthalene.

11. A process as claimed in claim 7, wherein the graft polymer is obtained by polymerization at 30° to 80° C. in the presence of a catalyst.

12. A process of preparing a heat-stabilized polyvinyl chloride resin which comprises chlorinating a graft polymer, which is obtained by grafting a mixture consisting of 90 to 70 parts by weight of porous polyvinyl chloride and 10 to 30 parts by weight of vinyl aromatic monomer in the presence of catalyst selected from water-soluble and oil-soluble catalyst.

13. A process as claimed in claim 12, wherein the chlorination is effected with ultraviolet irradiation in the presence of chlorine gas.

14. A process as claimed in claim 12, wherein the porous polyvinyl chloride is obtained by suspension polymerization.

15. A process as claimed in claim 12, wherein the vinyl aromatic compound monomer is styrene.

16. A process as claimed in claim 12, wherein the graft polymer is obtained by adsorbing the vinyl aromatic compound monomer to the porous polyvinyl chloride, dispersing a mixture of polyvinyl chloride and vinyl aromatic monomer in an aqueous medium, and grafting the mixture at 30° to 80° C. in the presence of the catalyst.

* * * * *